US005112427A

United States Patent [19]

Bekker-Madsen

[11] Patent Number: 5,112,427

[45] Date of Patent: May 12, 1992

[54] METHOD AND DEVICE FOR DISPENSING OF LABELS

[75] Inventor: Per Bekker-Madsen, Vojens, Denmark

[73] Assignee: Dennison Systems Denmark, Vojens, Denmark

[21] Appl. No.: 604,749

[22] Filed: Oct. 26, 1990

Related U.S. Application Data

[62] Division of Ser. No. 411,393, Sep. 22, 1989, Pat. No. 5,017,412.

[30] Foreign Application Priority Data

Sep. 22, 1988 [DE] Fed. Rep. of Germany ....... 3832239
Aug. 23, 1989 [DE] Fed. Rep. of Germany ....... 3927821

[51] Int. Cl.[5] ............................................ B32B 31/00

[52] U.S. Cl. .................................... 156/259; 156/256; 156/521; 156/DIG. 33; 156/DIG. 35; 83/44; 83/105; 83/212.1; 83/214

[58] Field of Search ............... 156/528, 566, 252, 259, 156/256, 517, 519, 521, 556, 569, DIG. 33, DIG. 35; 83/43, 44, 30, 52, 105, 212.1, 214

[56] References Cited

U.S. PATENT DOCUMENTS

| | | | |
|---|---|---|---|
| 884,263 | 4/1908 | Buchanan | 156/528 |
| 1,136,758 | 4/1915 | Ballard | 83/105 X |
| 3,786,704 | 6/1974 | Lachaussee et al. | 83/52 X |
| 3,886,032 | 5/1975 | Artelt, Jr. | 156/566 X |
| 3,920,122 | 11/1975 | Koehlinger et al. | 428/43 X |
| 3,966,534 | 6/1976 | Oddy | 156/528 X |

FOREIGN PATENT DOCUMENTS

| | | |
|---|---|---|
| 1169836 | 5/1964 | Fed. Rep. of Germany . |
| 1966327 | 12/1972 | Fed. Rep. of Germany . |
| 2461308 | 7/1975 | Fed. Rep. of Germany . |
| 2645131 | 4/1977 | Fed. Rep. of Germany . |
| 3832239 | 3/1990 | Fed. Rep. of Germany . |
| 1909151 | 9/1990 | Fed. Rep. of Germany . |

*Primary Examiner*—Michael W. Ball
*Assistant Examiner*—Mark A. Osele
*Attorney, Agent, or Firm*—Arthur B. Moore

[57] ABSTRACT

A system for dispensing labels for labelling goods which move in single file past a labelling position, using a strip of labelling material in which labels are pre-punched to leave adhesive bridges. The strip of labels is drawn from a supply to a dispenser. As a new label reaches the dispenser in a "ready" position, the preceding label arrives at the labelling position in a linear extension of its travel. At the dispenser, the label is separated from label skeleton of the strip of labels by deflecting the label skeleton. Individual labels are pre-punched in a paper strip across the entire area of the label, with the exception of narrow adhesive bridges. Adhesive bridges furthest forward are separated first, followed by adhesive bridges to the rear of the label, shortly before the label is separated from the label skeleton.

13 Claims, 6 Drawing Sheets

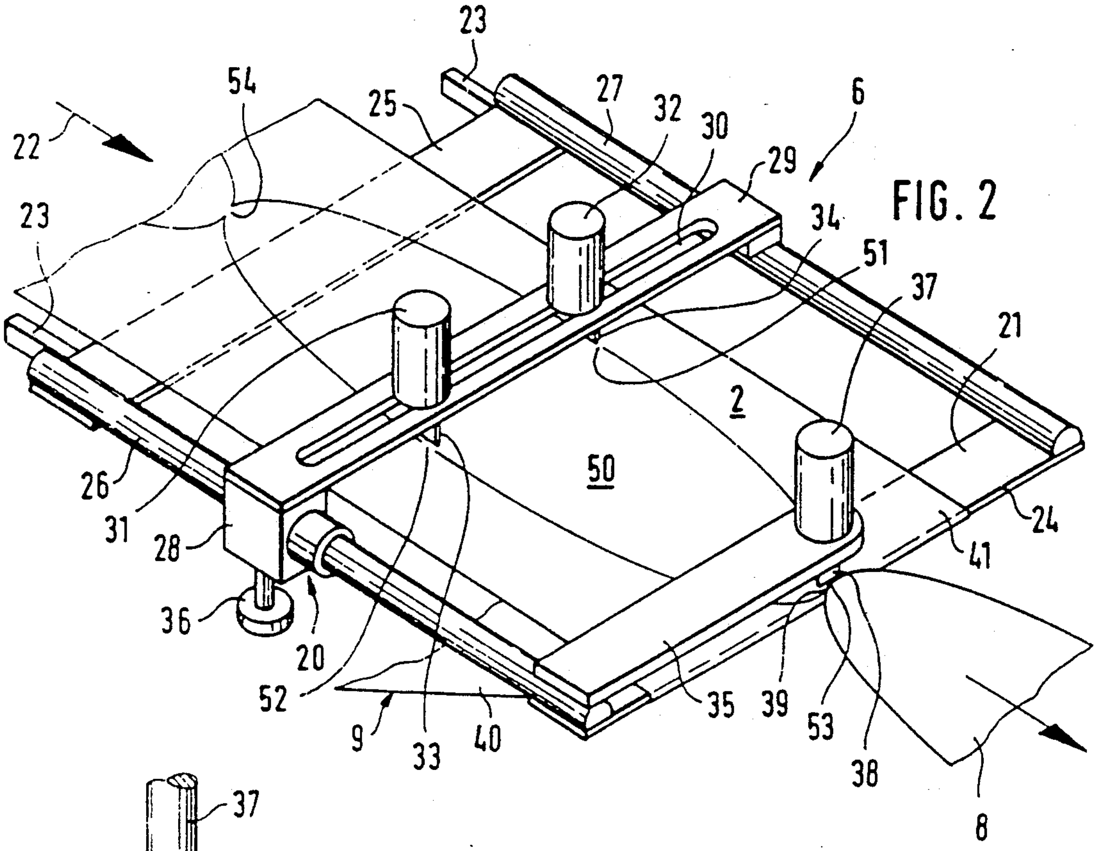
FIG. 2
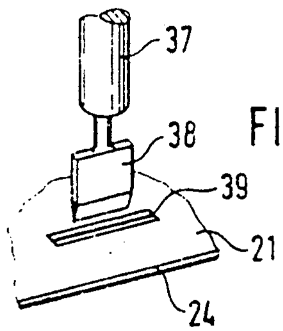
FIG. 3
FIG. 7
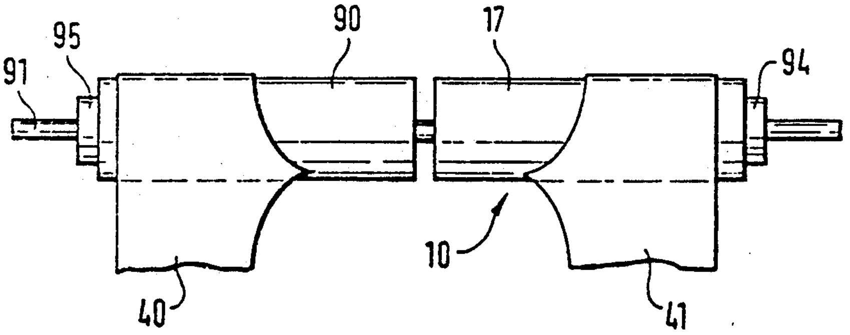

FIG. 4
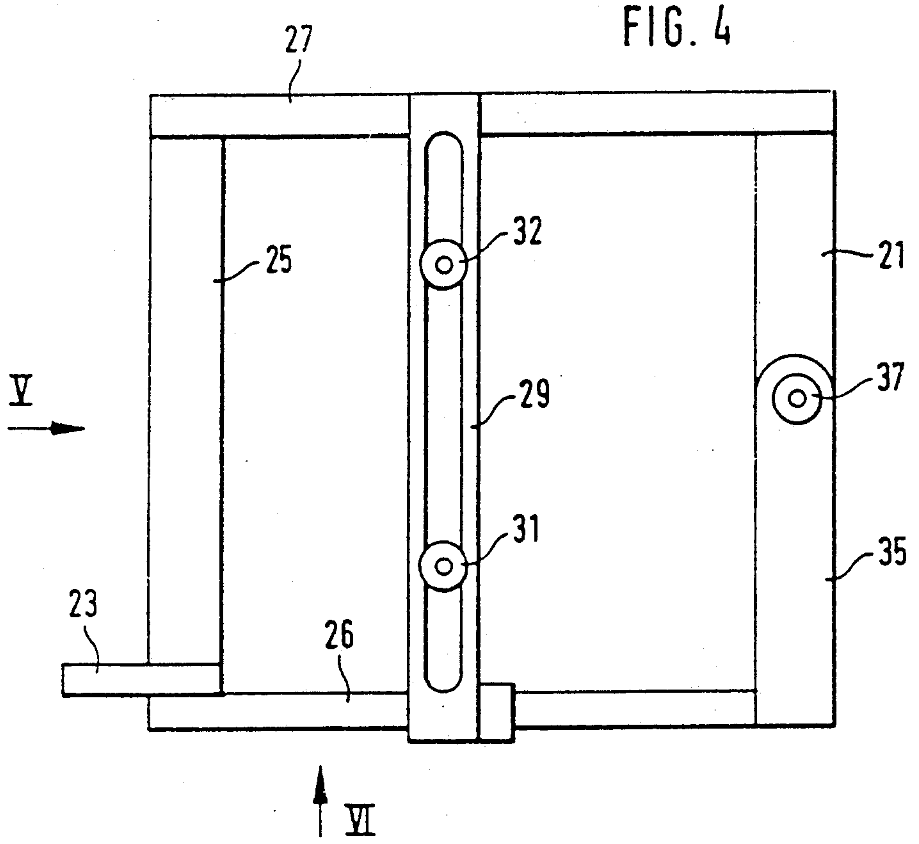
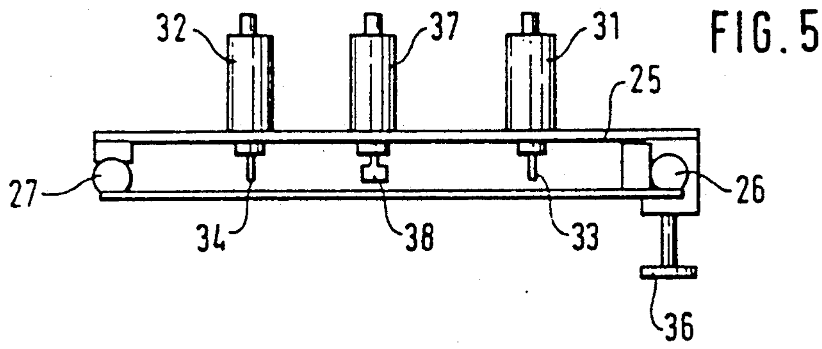
FIG. 5
FIG. 6
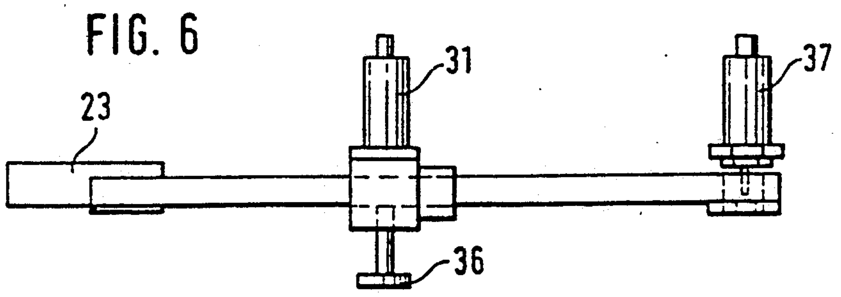

FIG. 18
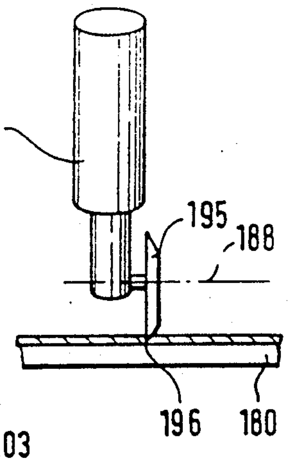
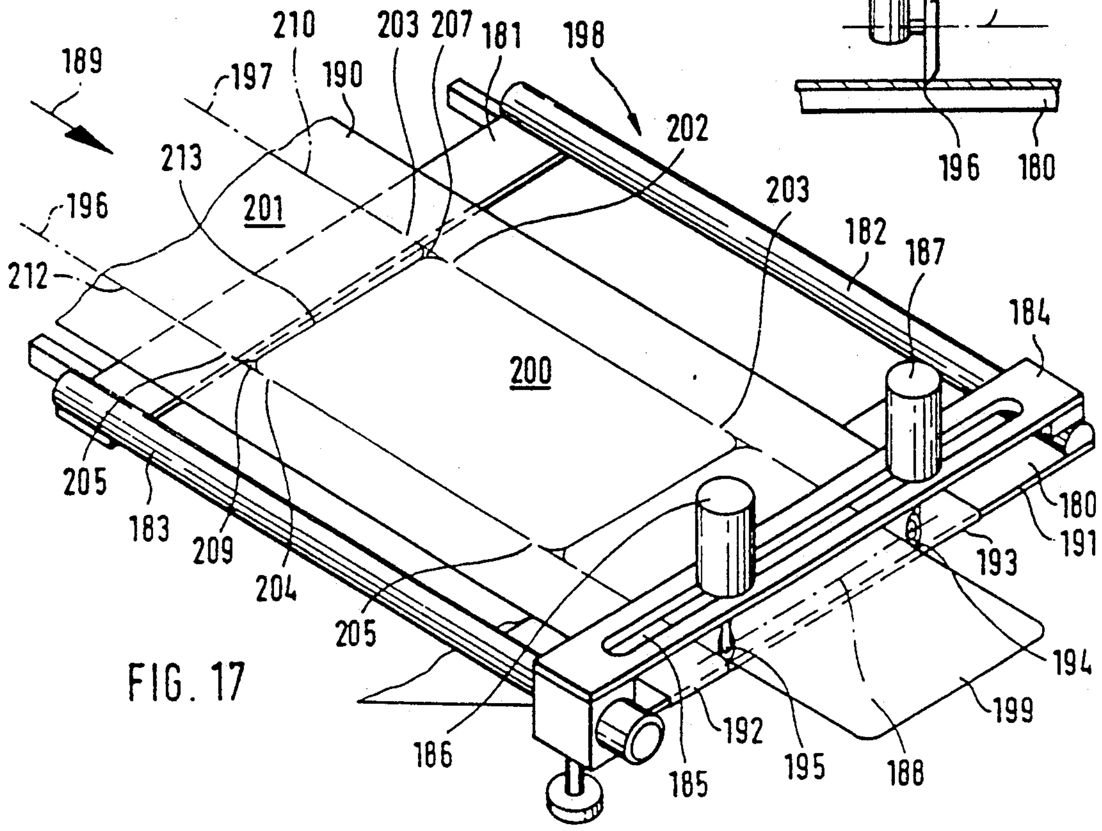
FIG. 17
FIG. 21
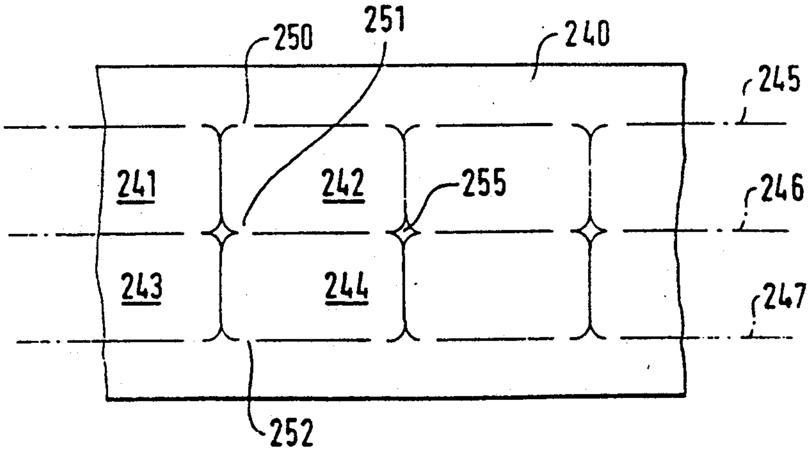

METHOD AND DEVICE FOR DISPENSING OF LABELS

This is a divisional of co-pending application Ser. No. 411,393 now U.S. Pat. No. 4,017,412 filed on Sep. 22, 1989.

The invention concerns a method for dispensing of labels for labelling goods, together with a device and a strip of labels for the implementation of this method. The goods are conveyed in single file past a labelling position and are thereby provided with a label located in the labelling position.

The invention is concerned with the type of labelling system in which a strip of labels in which the labels are consecutively arranged is coiled into a reel, or a similar supply arrangement; the strip of labels is then drawn from the supply and fed to a label dispenser. As a new label reaches the label dispenser in a 'ready' position, the next label arrives at the labelling position from the label dispenser in linear extension of its last section of travel; at the same time, this label is separated from the backing material of the strip of labels by means of the deflection of the backing material at the edge of the label dispenser in a direction diverging considerably from the direction of travel of the label advancing to the labelling position. Propulsion of the strip of labels is achieved by pulling on the backing material which has already been separated from the labels.

In the case of a labelling machine described in U.S. Pat. No. 4,224,872, the strip of labels consists of a backing material to which the labels are temporarily attached by means of a layer of self-adhesive glue. Such strips of labels are costly.

The task of the invention is to improve on a method and device of the nature described above, in that such method and device can be operated with simpler and less costly strips of labels.

SUMMARY OF THE INVENTION

A method in the form of the invention utilizes a strip of labels in the form of a tape made of label material, preferably paper; the labels are pre-punched from the strip of labels, before the supply is formed from the strip, using a punch blank which extends over the entire area of the label in each case, with the exception of some narrow adhesive bridges; those adhesive bridges which are located furthest forward in the direction of travel of any given label are severed first; only then are the adhesive bridge or bridges located to the rear (relative to the direction of travel) separated. This happens shortly before the label in question is separated from the backing material.

In addition to paper, other punchable sheet material may also be considered, for example, plastic film, metal foil or textiles.

Since the labels in the strip are largely pre-punched, almost any desired external appearance can be achieved by means of the pre-punching. The adhesive bridges which are left behind, and which temporarily secure the labels in the strip, can be sufficiently narrow, and positioned in such a way, that they can be separated with one straight cut or tear, without this showing to disadvantage in the external appearance of the finished label. The separation can be achieved, for example, by means of punching, cutting, tearing, burning through, melting through or with the help of a gas beam, in accordance with the label material used. Punching or cutting is preferred for the method of separation, since it results in a clean separation at moderate expense, regardless of the material used for the labels.

At the next stage of applicant's method, the adhesive bridges located forward of a label are separated, and the label in question is at first freed from the skeleton material sufficiently to prevent it from following the deflected movement of the skeleton material at the edge of the label dispenser, so that it moves directly to the labelling position instead. The one or more adhesive bridges located to the rear are at first left behind, thus forming a temporary last connection with the skeleton material as the label in question advances towards the labelling position; the forward movement of the label towards the labelling position ensures this connection.

BRIEF DESCRIPTION OF THE DRAWING

The invention is now described in more detail using the drawing attached.

In the drawing:

FIG. 2 shows a perspective view of the label dispenser in FIG. 1;

FIG. 3 shows a detail from FIG. 2 on a larger scale;

FIG. 4 shows the label dispenser from FIG. 2 viewed from above;

FIG. 5 shows the label dispenser from FIG. 4 viewed in the direction of the arrow V;

FIG. 6 shows the label dispenser from FIG. 4 viewed in the direction of the arrow VI;

FIG. 7 shows the coiling mechanism from FIG. 1 with the relevant skeleton material strip;

FIG. 17 shows a perspective view of another version of the label dispenser which can be used instead of the label dispenser from FIGS. 2 to 6 on the labelling machine from FIG. 1, for processing strips of labels in accordance with FIGS. 18 to 21; and FIGS. 18–21 show further versions of label strips.

DETAILED DESCRIPTION

Figure 1:
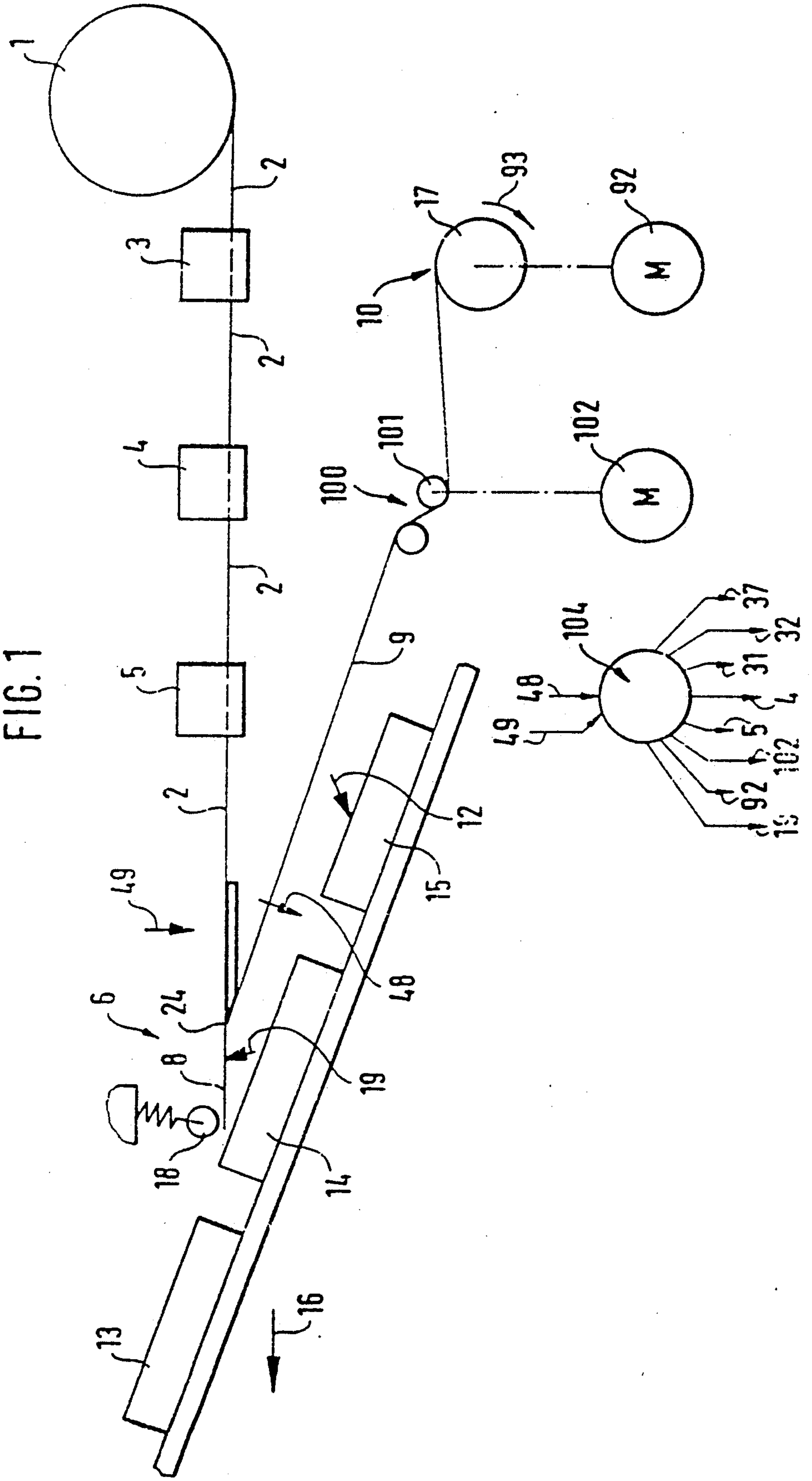
FIG. 1 shows a labelling machine in accordance with the invention, viewed in rough outline from the side.

In FIG. 1, (1) designates a label strip reel, from which the strip of labels (2) is pulled. The strip of labels (2) first passes through a strip tensioning device (3), then through the label printer (4), which may be omitted if the labels are already printed or are not to be printed.

Following this, the strip of labels passes through a strip store (5), which stores a section of label strip elastically in the form of a loop. Then the strip of labels (2) arrives at the label dispenser (6).

The label dispenser (6) displays a dispensing lip (24) which extends transversely across the width of the strip of labels. The skeleton material strip (9) is led back over this dispensing lip at an acute angle, arriving at the coiling mechanism (10), whilst the labels, because of their internal rigidity, continue their movement straight ahead to arrive one after another, free from the backing material, at the labelling position, which is receiving the label (8) in FIG. 1. The label which has reached the labelling position passes through a gluing mechanism (19), where it is glued on the reverse side, for example by spraying of adhesive.

Goods (13, 14, 15) are conveyed past the labelling position in file, in the same direction of travel as shown by arrow (16) and at approximately the same speed as the labels (e.g. label 8) are dispensed. A pressure roller presses the label (8) which has been dispensed and is at the labelling position, on to the goods (14) passing by, so that the label adheres immediately. Instead of the gluing mechanism directed at the rear side of the label (19), it is also possible to provide a gluing mechanism directed at the relevant place on the goods (15) supplied for labelling. Instead of the gluing mechanisms, it is also possible to provide actuation mechanisms for cases where inactive layers of adhesive are already present on the back of the label or on the top surface of the goods, but must be actuated in order to adhere (for example by moistening or heating).

(100) designates a drive mechanism which features a driven roller (101), around which the skeleton material strip (9) is looped. This roller is driven in steps by the motor (102), propelling the skeleton material strip and thus pulling the strips of labels (2). With each step, the strip of labels (2) moves forward a distance of one label. In addition, a drive for the strip of labels (2) is provided in the strip store (5). These drives are controlled in relation to the goods passing through; this is done by a control mechanism (104) which also controls the gluing mechanism (12) or (19) if necessary. This control mechanism is itself controlled by a first photoelectric barrier (48), which is directed at the path of travel of the goods to be labelled (13, 14, 15) and by a second photoelectric barrier (49) which is directed at the labels reaching the label dispenser (6).

Each time the strip of labels advances one step forward, a label located at the 'ready' position on the label dispenser (6) moves into the labelling position, where the label (8) is received, moving from there to the goods in question.

The skeleton material strip, that is, that part of the strip of labels which does not constitute the labels themselves, is wound around the reel (10), which is slip-driven by the motor (92), in the direction of rotation indicated by arrow (93). Motor (92) is also controlled by control mechanism (104).

Figure 8:
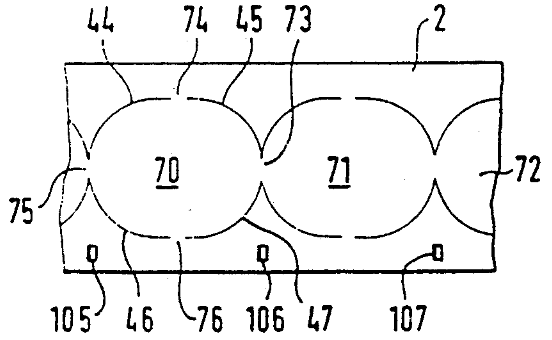
FIGS. 8–15 show sections of various versions of label strips, suitable for processing on the labelling machine in accordance with FIGS. 1 to 7.
Figure 11:
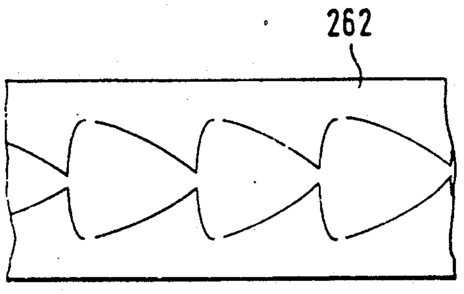
Figure 9:
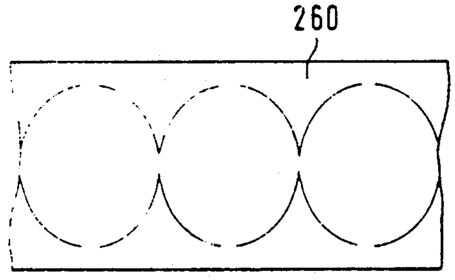

The strip of labels (2) consists of a paper tape, from which labels (50, 51, 70, 71 and 72) are punched, leaving behind adhesive bridges (53, 54, 73, 74, 75 and 76); this can be seen in FIG. 8. These punching operations take place before the strip of labels (2) is wound around the reel, preferably in the paper factory.

The label dispenser will now be described in more detail with the help of FIGS. 2 to 6.

The label dispenser (6) consists of a frame (20) which is fastened by means of a securing element (23) to the chassis of the labelling machine from FIG. 1 (not shown). A flat dispensing track (21) is fixed to the frame; the track extends parallel to the path of the strip of labels (2) and transversely to the direction of advance (arrow 22) of the strip of labels (2). The dispensing track is wider than the overall breadth of the strip of labels (2).

The dispensing track has a dispensing lip (24) located at the front, with reference to the direction of advance of the strip of labels (2) as shown by arrow (22). The width of the dispensing lip is also greater than the breadth of the path of the strip of labels. The dispensing track (21) is located immediately below the path of the strip of labels.

Corresponding to the dispensing track (21), a guiding track (25) is positioned at the rear end of the frame, extending below the path of the strip of labels, and in parallel plane to the path of the strip of labels. The two tracks (21 and 25) are connected to one another by rods (26 and 27), which run by the side of the path of the strip of labels. On rod 26, there is a longitudinally movable pedestal (28) which can be fixed in position by means of a manual screw (36), on which a punching bridge (29) is fixed, supported by the other rod (27). The punching bridge extends over the path of the strip of labels, and has a longitudinal opening (30) which runs the whole width of the path of the strip of labels; two punching rools (31 and 32) are fastened in this opening, in a laterally adjustable manner. These punching tools are magnetically actuable presses whose punches (33 and 34) have torsion-proof mountings; they are driven downwards by magnetic excitation from their non-active upper positions, right through the path of the strip of labels (2).

A further punching bridge (35) is positioned opposite the dispensing track (21), and also extends above the path of the strip of labels. A punching tool is positioned on this punching bridge, with exactly the same arrangement as punching tools (31) and (32). An opening (39) in the dispensing track (21) is provided for punch (38) of punching tool (37), as can be seen from FIG. 3. Punching tool (37) can also be moved laterally, but in this case, as a modification to the illustrated version, a longitudinal opening corresponding to longitudinal opening (3) is provided and punching bridge (35) is modified accordingly, if necessary. Opening (39) is then also extended by a longitudinal opening as required, or else separate additional openings are provided corresponding to the various positions of punching tool (37). Additional punching tools can then also be mounted on punching bridge (35) which is modified in this way. As well as punching bridges (29) and (35), is also possible to equip other punching bridges with additional punching tools. All punching tools are controlled by control mechanism (104).

The strip of labels (2) is shown in FIG. 8. Oval labels are punched out (70, 71, 72) which are identical in form and are pre-punched over their entire area, with the exception of four adhesive bridges each. The punching sections for the labels (70) are designated by (44, 45, 46 and 47) and cover about ¼ of the total area each. Adhesive bridges (73, 74, 75 and 76) are part of label (70). Adhesive bridge (73) is also part of label (71). Each of the adhesive bridges covers 2 mm of the area of the label in each case, and the overall dimension of the labels is 60 mm.

The two adhesive bridges 74 and 76 are located in the middle of the lateral convexities of the label area. The adhesive bridges are distributed equally over the area of the label. Labels (70, 71 and 72) as well as those labels not depicted from the strip of labels (2) are pre-punched in a geometrically identical manner, and are arranged individually in a consecutive and uniform line.

Punched holes (105, 106, and 107) are located in the strip of labels next to the labels themselves, to serve as markings for the photoelectric barrier (49). The punched holes are geometrically allocated to the individual labels. Instead of these punched holes, the photoelectric barrier (49) can also be directed at printed markings on specified contours of punching sections (44 to 47).

Since the consecutive labels touch one another in the area of the joint adhesive bridge, for example at adhesive bridge (73), two separated marginal strips (40, 41) are created on the skeleton material strip (9).

The three punching tools (31, 32 and 37) are adequate for the processing of a strip of labels according to FIG. 8. These three punching tools corresond to a label (50) or (70), which is stuck on to the skeleton material by four adhesive bridges in each case (51 to 54 or 73 to 76). The punches (33 and 34) are located transversely to the adhesive bridges (51 and 52) (or 74 and 76). Punch (38) is located transversely to adhesive bridges (53 and 54 or 73 and 75). The punches are wider than the relevant adhesive bridges, so that the adhesive bridge in question is in each case separated completely by one stroke of the punch, and the separating cut is an extension of punch sections (44, 45, 46 and 47).

In FIG. 2, the label (50) is in the 'ready' position on the label dispenser (6). In this 'ready' position, punches (33, 34 and 38) are directed at the adhesive bridges (51, 52 and 53), at the front in relation to the direction of advance shown by arrow (22). In this 'ready' position, it is referable when the strip of labels (2) is stationary for the three punching tools (31, 32 and 37) to be triggered simultaneously, separating adhesive bridges (51, 52 and 53) in one joint working movement.

In the course of the next cycle of forward travel of the strip of labels, label (50), pulled by the skeleton material strip (9) to which it is still attached by adhesive bridge (54) located at the rear, arrives at the labelling position where label (8) is shown in FIGS. 1 and 2. Now, the next label is at the 'ready' position and with the next punching cycle, adhesive bridge (54) or label (50), which is now in the position of adhesive bridge (53) from FIG. 2, is separated and so label (50) is completely released from the backing material strip.

During the forward travel of the strip of labels (2), the skeleton material strip (9), consisting of two marginal strips (40 and 41), is led around the dispensing lip (24) and diagonally back to the reeling mechanism (10) at an acute angle.

FIG. 7 shows that the reeling mechanism (10) has two reeling rollers (17, 90). These two rollers are mounted coaxially on drive shaft (91), which is driven by the motor (92) in the direction of rotation of arrow (93) (compare FIG. 1). The drive movement of shaft (91) is transmitted by one sliding clutch mechanism each (94 or 95) to reeling rollers (17 or 90). Marginal strip (40) is relled around reeling roller (90) and marginal strip (41) is reeled around reeling roller (17). The two sliding clutch mechanisms (94 and 95) ensure that the two reeling rollers (17 and 90) have slack independently of one another. This guarantees that small differences which may arise in the reeling diameter of the reeled marginal strips (40 and 41) can be compensated for.

FIGS. 9 to 15 and 19 to 21 show further sections of label strips (89, 136, 190, 220, 240, 260, 261, 262 and 263), with labels of different shapes. As in FIG. 8, the individual punching sections are also shown in FIGS. 9 to 13 and 19 to 21 by extended black lines. The sections are extremely narrow. In the case of all the strips of labels, the individual labels of the strips of labels concerned are geometrically identical to one another and are arranged behind one another in the same form. For the purposes of clarity, the adhesive bridges are shown broader than they should be according to the scale of the drawing. In reality, each adhesive bridge extends for 1 to 3 mm of the area of the label, even if the labels are considerably larger, for example 3 to 5 times as large as drawn. All the adhesive bridges of a label taken together constitute less than 10% of the respective border, but preferably from about 1 to 5% of the label area.

Figure 12:
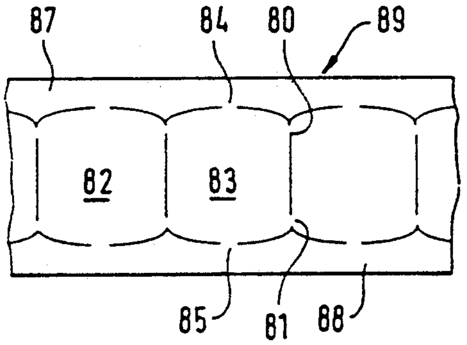
Figure 10:
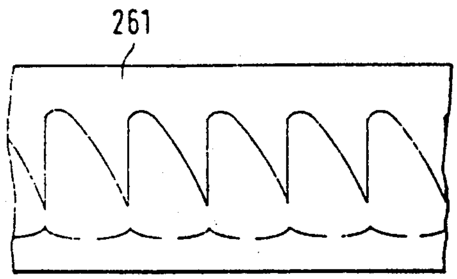

FIG. 12 shows labels which have the shape of a rectangle with rounded corners. The two adhesive bridges (80 and 81) belong respectively to two labels, namely labels (82 and 83). The adhesive bridges (84 and 85) connect label (83) with the lateral marginal strips (87 and 88) of the strip of labels (89). For this strip of labels, four punching tools are necessary, that is, two punching tools positioned at the same height instead of punching tool (37). Adhesive bridges (80 and 81) are punched with these punching tools, while adhesive bridges (84 and 85) are punched with the two other punching tools, all of which takes place in on joint punching cycle.

Figure 13:
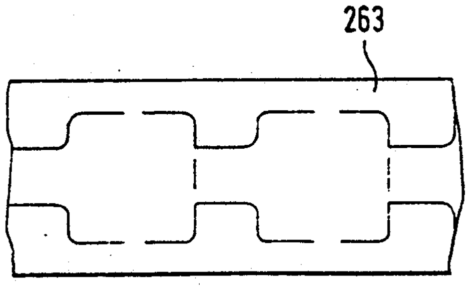

The same also applies to the strip of labels from FIG. 13.

Figure 14:
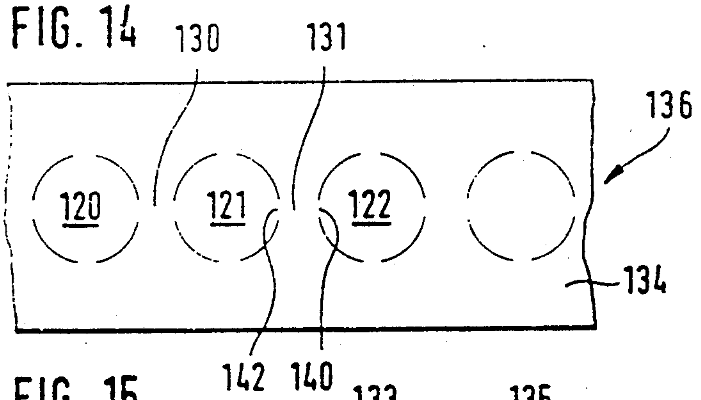
Figure 15:
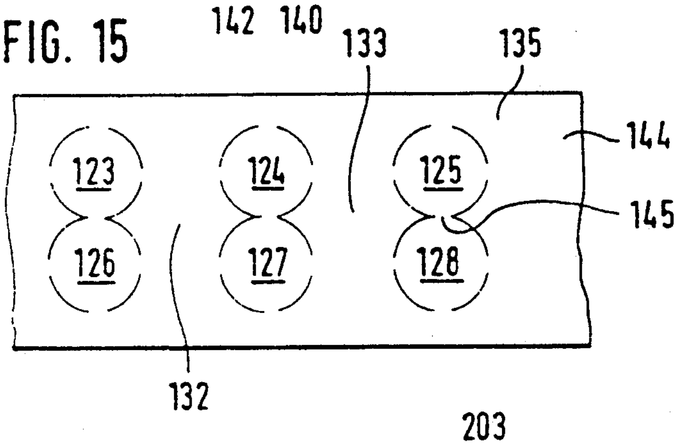

Whereas, in the case of the strips of labels shown in FIGS. 8 to 13, two consecutive labels—for example labels (70 and 71)—have one adhesive bridge—for example adhesive bridge (73)—in common, this is not the case for the strips of labels shown in FIGS. 14 and 15. Here, between consecutive labels (120 to 122), or (123 to 125), wastage strips (130, 131, 132 and 133) are left behind, which together with the other parts of the skeleton material strip form a ladder-like skeleton material strip (134, 135). In such a case, the skeleton material strip holds itself together. As a modification to the version shown in FIG. 7, only one single reeling roller for the entire skeleton material strip is provided, driven by one slip clutch mechanism.

For strip of labels (136) from FIG. 14, a double-cutter punch (137) is used instead of the punch (38) from FIG. 3. One cutter (138) separates adhesive bridge 140, and the other cutter (141) separates the adhesive bridge (142) of the next label, located opposite.

Figure 16:
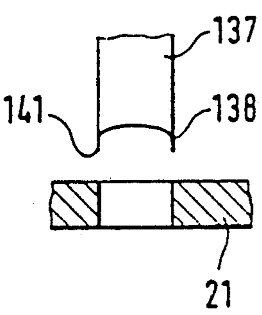
FIG. 16 shows as shown in FIG. 3, a punching tool to replace punching tool 38 when processing the label strip from FIG. 14 or FIG. 15.

In the strip of labels (144) from FIG. 15, two rows of labels are arranged next to one another, one row being formed by the visible labels (122 to 125) and the second row by labels (126 to 128). Neighbouring labels, for example labels (125 and 128) have one adhesive bridge (145) in common. For this strip of labels, two punches with two cutters each, as in FIG. 16, are needed on punching bridge 35, and three punches are needed on punching bridge 35.

In the example version of a label dispenser shown in FIGS. 17 and 18, the frame (198) consists of a dispensing track (180) corresponding to dispensing track (21), and a guiding track (181) corresponding to guiding track (25), linked to one another by rods (182 and 183), corresponding to rods (26 and 27). (184) designates a bridge which is mounted at the extreme front end of rods (182 and 183), having a longitudinal opening (185) in which two cutting tools (186 and 187) are mounted with adjustable positions. Cutting tool (186) features a rotating-drive cutter (195), whose axis of rotation (188) runs transversely to the direction of advance (189) of the strip of labels (190). The cutter (195) is a circular cutter and its blade reaches as far as the upper surface of the dispensing track (180), right next to the dispensing lip (191), corresponding to dispensing lip (24). The strip of labels is fed over the guiding track (181) and the dispensing track (180), and the labels arrive one after another in the labelling position, whilst the skeleton material strip, which consists of two marginal strips (192 and 193), is led back at an acute angle over the dispensing lip (191). The two cutters, blade (195) and the cutter (194) of cutting tool (187) which is correspondingly arranged and driven, are directed at the two dotted lines (196 and 197). Between these two parallel lines, which run parallel to the direction of advance (189), labels (199, 200 and 201) are aligned. All adhesive bridges, such as, for example, adhesive bridges (202, 203, 204, 205, 214, 215, 216, 217) cross one of these lines (196 and 197) and thus enter the zone of operation of cutters (194 and 195) when the strip of labels is moved forward, just before they reach the dispensing lip (191); they are then separated. In this way, the individual labels are released from the skeleton material strip formed by the marginal strips (192 and 193).

Figure 19:
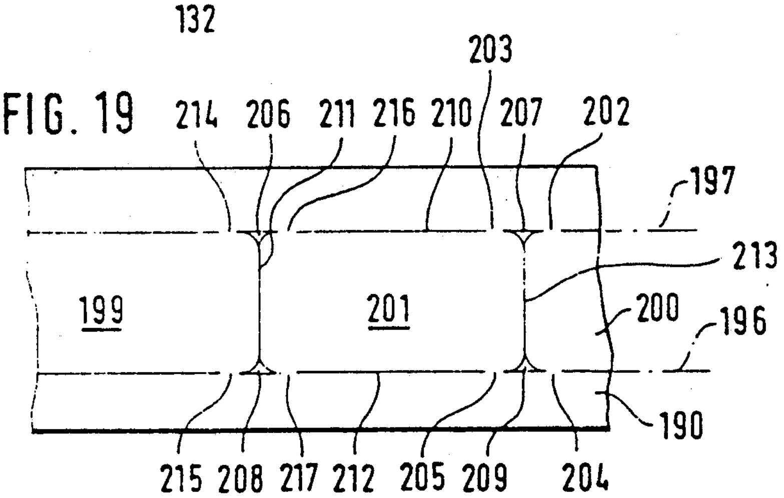

The strip of labels (190) is again shown in FIG. 19. The individual labels have the shape of a rectangle with rounded corners. Recesses (206, 207, 208 and 209) are provided near the corners, between the dotted lines (197 and 196); these recesses are punched in the strip of labels together with punch sections (210, 211, 212, 213), before the strip of labels is wound round the reel. In this way, there is no accumulation of waste material on the dispensing track as a result of the superfluous triangular pieces.

Figure 20:
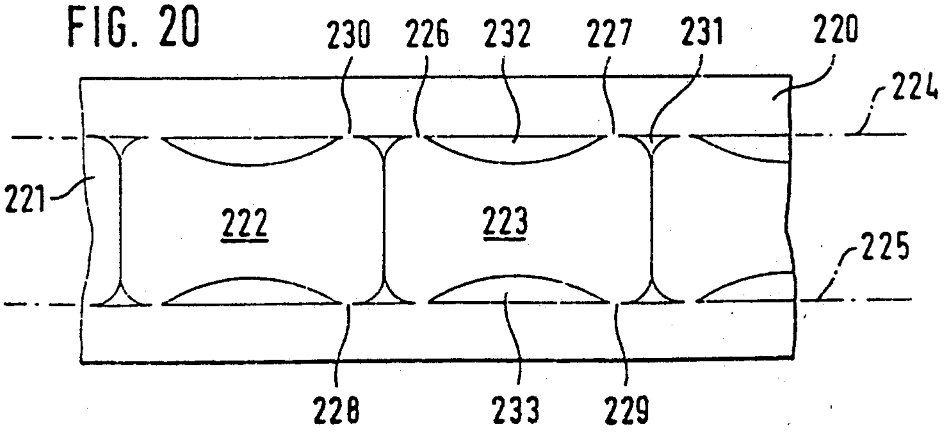

The strip of labels (220) from FIG. 20 is also suitable for the label dispenser from FIG. 17. Labels (221, 222 and 223) are located between the parallel dotted lines (224 and 225) along which the cutters (194 and 195) cut, and all the adhesive bridges, for example, adhesive bridges (226, 227, 228 and 229) cross one of these lines (224 and 225). The labels have a constricted rectangular shape with rounded corners. For this purpose, in addition to the recesses (231), lateral recesses (232, 233) are provided at the corners. It can be seen from FIGS. 19 and 20 that labels can be pre-punched in a large number of different shapes; the inmportant point is that the adhesive bridges required should cross the parallel lines (224 and 225).

FIG. 21 shows a strip of labels (240) with two rows of labels (241 to 244), to which three parallel dotted lines (245, 246 and 247) are allocated. Each of these lines is allocated to a cutter. Thus for processing this strip of labels (240) through the label dispenser in accordance with FIG. 17, three cutting tools are to be provided instead of the two cutting tools (186 and 187). Adhesive bridges, such as, for example, adhesive bridges (250, 251 and 252) all cross one of these dotted lines (245, 246 and 247), so that they can be caught by the relevant cutter.

In the interests of giving the labels a rounded shape, recesses, such as, for example, recess (255) are punched into the strip of labels.

The strips of labels to be used in conjunction with the invention are very favourably priced in comparison to those used in the state of the art at present. This is because they can consist of one single strip of paper, which can be provided by manufacture with the requisite punchings and, if applicable, the requisite printing. Any coating necessary can also be applied. Hardly any waste is produced, apart from the backing material strip.

As a modification to the example version presented, the strip of labels can also be moved forward continuously instead of in cycles; the release of labels on to to the goods can also be arranged differently, for example by keeping the labels at the labelling position by air suction at first, and then applying them to the goods by pressurized air. Instead of a single paper strip as shown in the example version, the strip of labels can also be made of a different labelling material, and it may be coated on the reverse with a layer of adhesive, which is at first inactive and is then adhesion-actuated when the individual labels are released into the labelling position, by means of an actuation device corresponding to gluing mechanism (19). If the gluing or actuation of the adhesive is carried out by application of a liquid, this may be sprayed on, but it is preferable to apply it by means of continually rotating glue or liquid rollers.

I claim:

1. A method for dispensing labels for the labelling of goods conveyed sequentially past a labelling position, comprising the steps of:

feeding a strip of labels from a supply to a label dispenser, individual labels being pre-punched in the material of said strip over the entire periphery of the label excepting a plurality of narrow adhesive bridges, to define a label skeleton surrounding said labels;

advancing the label strip from the label dispenser to the labelling position in a linear extension of its travel from the supply to the label dispenser, so that a label arrives at the labelling position as the succeeding label reaches a ready position at the labelling dispenser;

separating each label arriving at the label dispenser from the remainder of the label strip by deflecting the label skeleton material in a direction diverging considerably from the direction of travel of the label as it advances to the labelling position, wherein forwardmost adhesive bridges of the label strip are separated first followed by adhesive bridges located further to the rear.

2. A method in accordance with claim 1, wherein the strip of labels comprises a paper tape.

3. A method in accordance with claim 1, wherein the strip of labels is propelled by pulling on the label skeleton which has already been separated from the labels.

4. A method in accordance with claim 1, wherein at least one adhesive bridge located to the rear of a label is separated in each case together with an adhesive bridge located forward of the next label, using a common tool in one common working movement.

5. A method in accordance with claim 1, wherein consecutive labels on said label strip have at least one common adhesive bridge, so that after separation of labels the label skeleton consists of two strips which are pulled with independent slack.

6. A method in accordance with claim 4, wherein one or more adhesive bridges located furthest forward in the direction of travel of each label are severed in one joint working movement when the label in question is at the 'ready' position; and one or more remaining adhesive bridges of the labels in question are severed in the next working movement together with the adhesive bridges located forward of the next label in the strip.

7. A method in accordance with claim 6, wherein consecutive labels on said label strip have at least one common adhesive bridge, so that after separation of labels the label skeleton consists of two strips which are pulled with independent slack.

8. A method in accordance with claim 5, wherein one or more adhesive bridges located furthest forward in the direction of travel of each label are severed in one joint working movement when the label in question is at the 'ready' position; and one or more remaining adhesive bridges of the labels in question are severed in the next working movement together with the adhesive bridges located forward of the next label in the strip.

9. A method in accordance with claim 1, wherein all adhesive bridges in a series of labels cross one of two given parallel lines, between which all labels of this series are arranged; and the adhesive bridges are severed by means of stationary separators aligned with these lines as the strip of labels is pulled forward.

10. A method in accordance with claim 4, wherein all adhesive bridges in a series of labels cross one of two given parallel lines, between which all labels of this series are arranged; and the adhesive bridges are severed by means of stationary separators aligned with these lines as the strip of labels is pulled forward.

11. A method in accordance with claim 5, wherein all adhesive bridges in a series of labels cross one of two given parallel lines, between which all labels of this series are arranged; and the adhesive bridges are severed by means of stationary separators aligned with these lines as the strip of labels is pulled forward.

12. A method in accordance with claim 1, wherein the rear sides of the labels are adhesion-activated immediately after they have left the 'ready' position.

13. A method in accordance with claim 2, wherein the rear sides of the labels are adhesion-activated immediately after they have left the 'ready' position.

* * * * *